Patented Sept. 29, 1953

2,653,951

UNITED STATES PATENT OFFICE 2,653,951

1-(2-DIETHYLAMINOETHYLAMINO)-4,7-DIMETHYLTHIAXANTHONE, ACID ADDITION SALTS THEREOF AND PREPARATION OF THESE COMPOUNDS

Sydney Archer, Albany, N. Y., assignor to Sterling Drug Inc., New York, N. Y., a corporation of Delaware No Drawing. Application June 19, 1951,
Serial No. 232,477

4 Claims. (Cl. 260—328)

This invention relates to new chemotherapeutically useful thiaxanthone compounds and to the preparation thereof. In particular, said thiaxanthone compounds are 1-(2-diethylaminoethylamino)-4,7-dimethylthiaxanthone and its acid addition salts.

The compounds of this invention have been found to possess useful chemotherapeutic properties, for instance as agents in treating schistosomiasis.

The thiaxanthone compound, 1-(2-diethylaminoethylamino) - 4,7 - dimethylthiaxanthone, having the formula

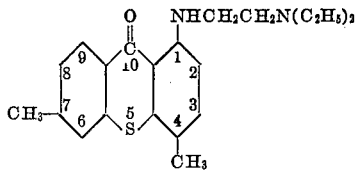

is prepared by heating, preferably in refluxing pyridine at atmospheric pressure, 2-diethylaminoethylamine with a 1-halo-4,7-dimethylthiaxanthone where halogen means chloro, bromo, iodo or fluoro. The intermediate 1-halo-4,7-dimethylthiaxanthone is prepared by cyclizing a 2-(2 - methyl - 5 - halophenylmercapto) - 4-methylbenzoic acid which, in turn, is prepared by heating a metal salt of a 2-halo-4-methylbenzoic acid with a metal salt of a 2-methyl-5-halothiophenol in the presence of a copper catalyst. This latter preparation and the 2-(2-methyl-5-halophenylmercapto)-4-methylbenzoic acids obtained thereby are disclosed and claimed in my copending application Serial No. 197,174, filed November 22, 1950, now abandoned.

The thiaxanthone of my invention, 1-(2-diethylaminoethylamino) - 4,7 - dimethylthiaxanthone, is therapeutically active when administered orally whether employed in the form of its free base or in the form of its salts with relatively non-toxic organic or inorganic acids, although in most cases the salt form is more convenient to employ. These salts are prepared by treating said basic thiaxanthone compound with the appropriate acid. In practicing my invention, I found it convenient to isolate the thiaxanthone compound as its hydrochloride salt. However, other acid addition salts are within the scope of my invention, such salts including the hydrobromide, phosphate, sulfate, citrate, ethanesulfonate, tartrate, succinate, acetate, benzoate, mandelate, oleate, and the like.

Specific embodiments of my invention are further illustrated in the following examples:

A. 1-chloro-4,7-dimethylthiaxanthone

A mixture of 10 g. of 2-(2-methyl-5-chlorophenylmercapto)-4-methylbenzoic acid and 100 g. of concentrated sulfuric acid was heated with stirring on a steam bath for ninety minutes. The reaction mixture was cooled, poured into water and the resulting aqueous mixture filtered. The yellow solid was suspended in dilute ammonia and heated to boiling. After ten minutes the solid was filtered, washed with water and then with acetone, and dried. There was thus obtained 8.5 g. of 1-chloro-4,7-dimethylthiaxanthone, M. P. 147.8–148.3° C. (cor.) when recrystallized from acetic acid-water.

Anal.: Calcd. for $C_{15}H_{11}ClOS$: C, 65.56; H, 4.04. Found: C, 65.47; H, 4.35.

B. 1 - (2 - diethylaminoethylamino) - 4,7 - dimethylthiaxanthone hydrochloride A mixture of 7.0 g. of 1-chloro-4,7-dimethylthiaxanthone, 5.0 g. of 2-diethylaminoethylamine and 5.0 g. of pyridine was refluxed for eighteen hours at atmospheric pressure, resulting in the formation of 1-(2-diethylaminoethylamino)-4,7-dimethylthiaxanthone. The reaction mixture was cooled to about 80° C., poured into absolute ethanol (about 25 ml.) and the resulting solution was treated with an excess of 25% ethanolic hydrogen chloride to convert the base form of the thiaxanthone into its hydrochloride addition salt. On cooling, the desired hydrochloride separated; it was filtered, washed with cold ethanol and dried. This product, 1-(2-diethylaminoethylamino)-4,7-dimethylthiaxanthone, in the form of its hydrochloride, melted at 202–203° C. (cor.) when recrystallized from absolute ethanol.

Anal.: Calcd. for $C_{21}H_{26}N_2OS \cdot HCl$: N, 7.17; S, 8.20. Found: N, 7.01; S, 8.12.

I claim:

1. A compound selected from the group consisting of 1-(2-diethylaminoethylamino)-4,7-dimethylthiaxanthone having the formula

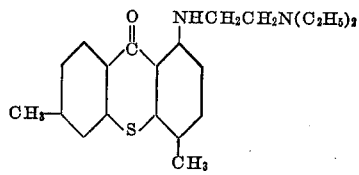

and acid addition salts thereof.

2. 1 - (2 - diethylaminoethylamino) - 4,7 - dimethylthiaxanthone having the formula

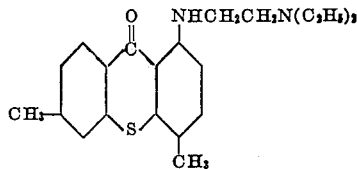

3. 1 - (2 - diethylaminoethylamino) - 4,7 - dimethylthiaxanthone hydrochloride having the formula

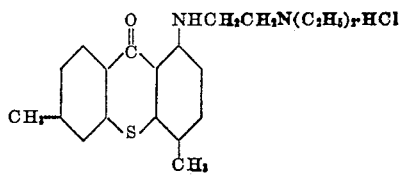

4. The process of preparing 1-(2-diethylaminoethylamino) - 4,7 - dimethylthiaxanthone having the formula

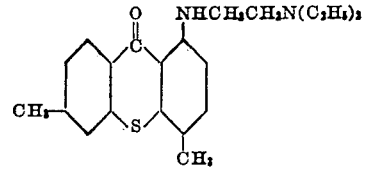

which comprises heating a 1-halo-4,7-dimethylthiaxanthone with 2-diethylaminoethylamine.

SYDNEY ARCHER.

References Cited in the file of this patent

Mauss, C. A., vol. 43, cl. 224–226 (1949).
Kikueth et al., C. A., vol. 43, cl. 9251–9252 (1949).